J. ADAIR.
MANUFACTURE OF SCISSORS.
No. 180,408. Patented Aug. 1, 1876.
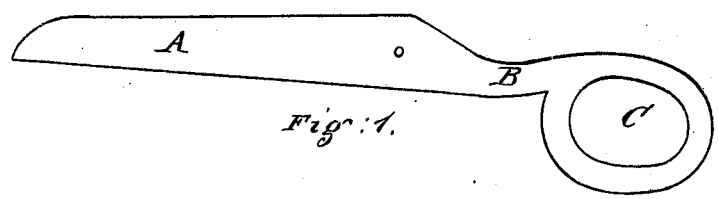
Fig. 1.
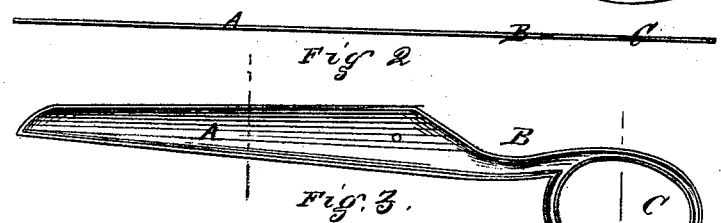
Fig. 2.
Fig. 3.
Fig. 4.
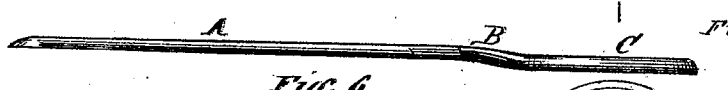
Fig. 6.
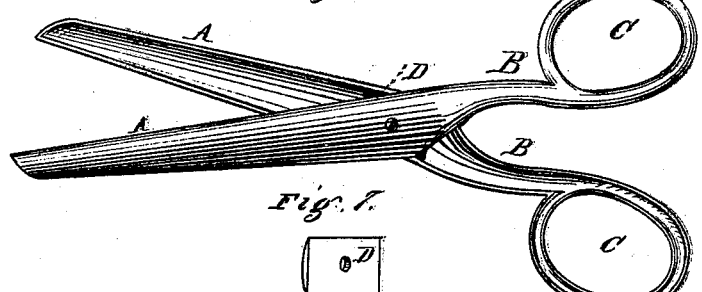
Fig. 7.
Fig. 8.
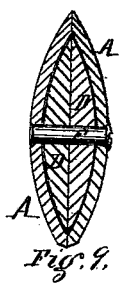
Fig. 9.
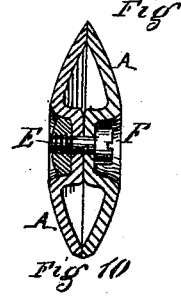
Fig. 10.
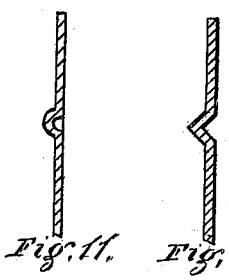
Fig. 11. Fig. 12.
Witnesses
Francis L. Clark
Fredrick A. Martin
Inventor
James Adair

UNITED STATES PATENT OFFICE.

JAMES ADAIR, OF KILLBUCK TOWNSHIP, ALLEGHENY COUNTY, PA.

IMPROVEMENT IN THE MANUFACTURE OF SCISSORS.

Specification forming part of Letters Patent No. 180,408, dated August 1, 1876; application filed May 17, 1876.

*To all whom it may concern:*

Be it known that I, JAMES ADAIR, of Killbuck township, (Pittsburg P. O.,) county of Allegheny, and State of Pennsylvania, have invented a new and useful Improvement in the Manufacture of Scissors, which improvement is fully set forth in the following specification, reference being had to the accompanying drawings.

The object of my invention is to economize material, labor, and time in the manufacture of scissors; and it consists in producing from sheet-steel of thinner gage than the apparent thickness of the finished article a blank, shown in the accompanying drawing, in which—

Figure 1 is a top view, and Fig. 2 an edge view, of the blade A, shank B, and eye C, all in one piece, which, by suitable dies, is struck up into a hollow form, as in Fig. 3, cross-sections of which through the blade and eye, respectively, are shown in Figs. 4 and 5, whereby the blank becomes convex on the outside and concave on the inside, from which results the required stiffness and roundness of blade, shank, and eye. The blade A and eye C are caused to lie in different planes, as seen in Fig. 6, by a bend in the shank B, so that when the right and left sections or halves of the scissors are riveted or screwed together, as in Fig. 7, the eyes C will not slip past, but will strike against each other, as usual.

It is apparent that two sets of dies will be required to make the right and left sections or halves of the scissors, the blades of which are ground to the customary edge.

To give a better bearing to the blades at the fulcrum, a piece of metal flat one side and convex on the other, as shown in Fig. 8, is placed in each blade, as seen in Figs. 7 and 9, and held to its seat by the entering pin or screw E; but instead of this bearing-piece, Fig. 8, when the blade is wide enough to permit it, I prefer to make a cup-shaped depression, F, Fig. 10, in the blade, the bottom of one to bear against the bottom of the other, the head and nut of the uniting-screw, as in Fig. 10, lying in these depressions. In Figs. 11 and 12 are shown other ways of stiffening the blank, Fig. 1, and to those skilled in the art divers other ways will be suggested; but I prefer the hollow or corrugation to extend from edge to edge throughout the entire section, as in Fig. 4.

The above-described scissors operate in the customary manner, and are light, cheap, and efficient.

Fully aware that stiffening sheet metal by fluting, crimping, corrugating, or ribbing is not new,

I claim—

1. The method of making scissors and shears by cutting the blanks for each blade, shank, and eye from sheet metal, stamping or swaging the blanks, hollowing on their inner and convex on their outer faces, and tempering, grinding, and riveting, substantially as set forth.

2. As a new article of manufacture, a pair of scissors or shears having hollow blades, shanks, and eyes, united by riveting, substantially as set forth.

3. In combination with hollow shear-blades, the bearing-pieces inserted in the hollow or concave seats of the blades, and having flat bearing-surfaces in the plane of cut, substantially as set forth.

JAMES ADAIR.

Witnesses:
 R. G. HOPE,
 SAML. W. HAY.